Oct. 1, 1946.    C. E. TWEEDLE    2,408,708
HYDRAULIC RELIEF VALVE
Filed Nov. 22, 1943
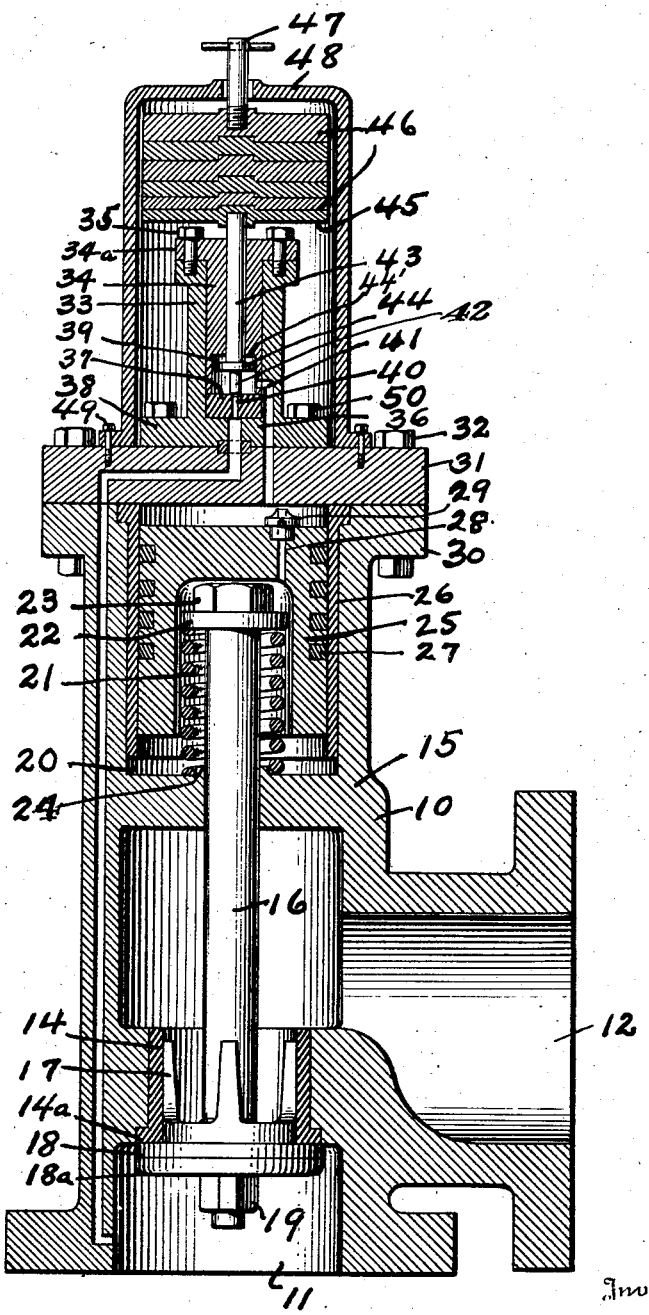
Inventor
C. E. TWEEDLE
By H. Yates Dowell
Attorney Patented Oct. 1, 1946

2,408,708

UNITED STATES PATENT OFFICE 2,408,708

HYDRAULIC RELIEF VALVE

Charles E. Tweedle, Great Lakes, Ill., assignor, by direct and mesne assignments, to Theodore Placette, Hays County, Tex.

Application November 22, 1943, Serial No. 511,301

2 Claims. (Cl. 137—53)

This invention relates to hydraulic relief valves and an object of the same is to provide a relief valve which is positive in operation and at the same time is of sturdy, simple construction and embodies parts which may be easily manufactured and assembled.

Another object is to provide a relief valve of the weight-biased type wherein the fluid pressure for operating the main valve is obtained directly from the main line carrying the fluid to be controlled, the valve being devoid of exterior piping and embodying a minimum number of parts which are readily replaceable when required.

Another object is to provide a relief valve embodying a main valve and a control unit for the main valve which while coacting with the main valve constitutes a separate assembly removable and replaceable whenever desired and devoid of springs, diaphragms, packing glands, etc., which tend to reduce the efficiency.

A further object of the invention is to improve and simplify a relief valve of the fluid operated type.

The foregoing and other objects and advantages will become apparent in view of the following description taken in conjunction with the drawing, wherein:

The figure is a transverse vertical section of a valve in accordance with the invention.

Referring to the drawing in detail, the valve assembly comprises a generally cylindrical main valve body or housing 10 which may consist of a suitable casting and is formed with an inlet port 11 and an outlet or relief port 12. Between these ports, the valve body is formed with a partition having an annular passage in which is inserted a valve sleeve 14 provided at its lower end with a seat 14a, the sleeve and seat preferably being formed of hardened steel or like wear-resisting material.

A transverse partition 15 is formed in the valve body or casting above the exhaust port or channel 12, and projecting therethrough is a valve stem 16 having a valve guide 17, a valve disc 18 and a plate 18a secured on the lower end thereof by means of nut 19.

Above the partition 15 is an annular chamber 20 in which the upper end of the valve stem 16 has movement, the said stem above the partition being encircled by a closure spring 21 held in place by means of washer 22 and nut 23, the lower end of said spring encircling a boss 24 formed on the top of the partition 15.

A power piston 25 is mounted for reciprocatory movement in a liner 26 having a press fit in the chamber 20, said liner being of hardened steel or like wear-resisting material and said piston being provided with sealing or packing rings 27 to insure against leakage between the piston and liner.

The piston 25 is provided with a port 28 in which is mounted a check valve 29 having a restricted passage therethrough to prevent entrapment of fluid above the piston when the latter moves upwardly and insure a smooth operation of the latter in a manner which will be more fully hereinafter explained.

The piston 25 and liner 26 constitute an assembly which may be removed and replaced when the upper end of the chamber 20 is rendered accessible.

The upper end of the main valve body or casting 10 is formed with a flange 30, and on this flange is mounted a plate-form cylinder head 31 by means of bolts 32, the latter being removable to facilitate removal and replacement of the head whenever found desirable or necessary.

Removably secured on top of the cylinder head 31 is a control valve assembly comprising a valve body 33 having inserted therein a valve bushing 34 formed with a top flange 34a which is removably secured to the valve body 33 by means of cap screws 35. The lower extremity of the control valve body 33 is formed with a seat 36 in which is removably disposed a valve seat 37 of suitable wear-resistant material, the said latter seat being held in place by the lower edge of the bushing 34 and a flange 38 formed on the body 33 at this point, the said seat 37 being installed in position on the flange 38 prior to insertion of the bushing 34.

Above the valve seat 37 the bushing 34 is formed with a relief valve chamber 39, and fluid is conducted to this chamber from the high pressure side of the system to be controlled by means of control valve port 40 which at its inlet end communicates with the inlet port 11 and at its discharge extremity passes through the cylinder head 31, relief valve body 33, and valve seat 37. The operating fluid passes from the chamber 39 through port or passage 41 and into the chamber 20 above the power piston 25, said port or passage 41 being formed in the valve body 33 and cylinder head 31.

Passage of fluid from the port 40 into the chamber 39 is controlled by means of valve member 42 secured on the lower end of valve stem 43, the latter being mounted to slide in the bushing 34 and at its lower end having an external flange 44 which cooperates with an internal shoulder 44' in sleeve or bushing 34 to limit movement of stem or plunger 43 relative to the sleeve.

It will be noted that the valve stem 43 is devoid of packing, leakage along the stem being avoided by means of a smooth tight fit between this stem and the member 34 at the upper end of the chamber 39. This insures a smooth operation of the valve stem 43 at all times without danger of binding.

On the upper end of the valve stem 43 there is secured a disc 45 which constitutes a weight table for supporting a series of graduated weights 46, the top weight being preferably provided with a lifting pin 47 which extends through a control valve cover 48 secured at its lower end to the cylinder head 31 by means of bolts 49.

In operation, fluid from the high pressure side of the system to be controlled exerts pressure on the valve member 42 through port or passage 40 and when this pressure rises the predetermined amount (determined by the characteristics or conditions of the system or machinery to be controlled), it unseats the valve member 42 and permits fluid to pass through port 41 into the chamber 20 above the power piston 25 to force the latter downwardly against the compressive action of the spring 21, thereby unseating the main valve 18 and permitting fluid under pressure to pass from the main line into and through the outlet 12. When this happens, excess pressure is released and the system resumes normal pressure whereupon the weights 46 close the valve 42 and the spring 21 forces the piston 25 upwardly and seats the valve 18.

The relief valve 29 insures a smooth action for the piston 25 since any fluid trapped on top of said piston or between the latter and the cylinder head 31 will flow through the restricted passage afforded by the check valve 29 and through port 28 into chamber 20 from which it may escape to relief passage 12 through a suitable opening in partition 15. Such an opening may be provided by suitable clearance between the stem 16 and the stem receiving aperture in partition 15.

If it is desired to test the valve while it is in operation, this may be accomplished by lifting the top weight having the lifting pin 47 attached thereto thereby unbalancing the control valve. When this happens, the pressure beneath the valve member 42 will unseat the latter and cause operation of the piston 25. If the valve closes when the weight is lowered to its normal position, the operation of the valve should be normal. Furthermore, this same expedient may be resorted to in the event the valve stem 43 or coacting parts should stick due to some unaccountable reason.

It is a decided advantage of the valve that the control valve assembly is a complete unit in itself separate from the main valve assembly and may be removed and replaced at will. The valve seat 37 is readily removable, and this member is preferably case hardened for long wear without leaking.

The control valve assembly contains no springs, diaphragm or packing glands, and in the main valve assembly only one spring is used which need not be of delicate or precision construction.

The liner 26 for the chamber 20 is preferably given a press fit, and simply by removing the head 31, this liner can be removed and replaced easily and conveniently at a slight cost.

No attempt has been made herein to enumerate all of the advantages and features of superiority of the improved valve assembly, it being understood that the foregoing description is merely illustrative, and further that certain minor changes in construction and design of the main valve assembly as well as control valve assembly may be made without departing from the scope of the invention as defined by the appended claims.

What is claimed is:

1. A pressure relief valve comprising a generally cylindrical hollow casting constituting the main valve body and having a fluid inlet at one end, an external flange at the opposite end and a fluid outlet adjacent said inlet, an apertured transverse partition between said inlet and said outlet to support a valve seat, and a second apertured transverse partition between said outlet opening and said flanged end to provide a piston chamber in the flanged end portion of said casting; a valve having a head cooperating with a valve seat carried by said first mentioned partition and a stem extending through both of said partitions and into said piston chamber; a spring surrounding said stem in said piston chamber urging said valve to closed position; a removable liner of wear resistant material in said chamber and a piston reciprocable in said liner and bearing on the upper end of said stem; a plate covering the flanged end of said housing and detachably secured to said flange, said valve, piston and liner being removable from said housing upon removal of said plate; a first fluid passage extending through said valve body and said plate from said fluid inlet to the outer side of said plate and a second fluid passage extending through said plate to said piston chamber; a pilot valve mounted on said plate and removable therewith comprising a hollow cylindrical member having an external flange at each end and an internal flange at one end, said one end being detachably secured through the corresponding external flange to said plate in position to cover the ends of said fluid passages; a hollow cylindrical valve sleeve inserted in said hollow cylindrical member and secured to the flange at the end thereof remote from said plate, a valve seat in said hollow cylindrical member between said internal flange and the adjacent end of said sleeve and having an aperture coaxial with said first plate passage, a valve plunger slidable in said sleeve and having an end portion effective to close said apertured valve seat and thereby interrupt flow through said fluide passages between said valve inlet and said piston chamber; a weight table and weights carried by said plunger to urge said end portion to aperture closing position; and a cup shaped closure for said pilot valve having a flanged open end detachably secured to said plate.

2. A pilot control valve assembly for a main pressure relief valve having a plate form valve head provided with a pair of adjacent fluid passage apertures, said assembly comprising: a hollow generally cylindrical pilot valve housing having an external flange at each end and an internal flange at one end, the external flange at said one end adapted to be detachably secured to said valve head with said internal flange adjacent said head and substantially concentric with one of said head apertures; a valve seat of wear resistant material within said housing resting on said internal flange and having an aperture coaxial with said one of the head apertures; a hollow sleeve provided with an internal shoulder, said sleeve being inserted in said housing and bearing at one end against said valve seat and provided at its opposite end with an external flange detachably secured to the corresponding external flange on said housing; a fluid passage in said sleeve and said housing leading from the space within said sleeve at the side of said seat remote from said internal flange to the other fluid passage aperture in said valve head; a valve plunger slidable in said sleeve provided at one end with an aperture closing portion cooperating with said seat, at its opposite end with a weight table and intermediate its length with an annular flange cooperating with said internal shoulder in said sleeve to limit movement of said plunger relative to said sleeve; removable weights on said weight table; and a cover for said pilot control valve adapted to be independently detachably secured to said valve head.

CHARLES E. TWEEDLE.